United States Patent
Kumar et al.

(10) Patent No.: US 11,044,347 B2
(45) Date of Patent: Jun. 22, 2021

(54) COMMAND COMMUNICATION VIA MPIO DRIVER AGNOSTIC OF UNDERLYING COMMUNICATION PROTOCOLS

(71) Applicant: EMC IP Holding Company LLC, Hopkinton, MA (US)

(72) Inventors: Kundan Kumar, Bangalore (IN); Shubham Sharma, Bangalore (IN); Sanjib Mallick, Bangalore (IN)

(73) Assignee: EMC IP Holding Company LLC, Hopkinton, MA (US)

(*) Notice: Subject to any disclaimer, the term of this patent is extended or adjusted under 35 U.S.C. 154(b) by 13 days.

(21) Appl. No.: 16/371,603

(22) Filed: Apr. 1, 2019

(65) Prior Publication Data
US 2020/0314218 A1    Oct. 1, 2020

(51) Int. Cl.
| | |
|---|---|
| *G06F 15/16* | (2006.01) |
| *H04L 29/06* | (2006.01) |
| *H04L 29/08* | (2006.01) |
| *G06F 13/42* | (2006.01) |
| *G06F 13/16* | (2006.01) |

(52) U.S. Cl.
CPC .......... *H04L 69/08* (2013.01); *G06F 13/1668* (2013.01); *G06F 13/4221* (2013.01); *H04L 67/1097* (2013.01)

(58) Field of Classification Search
CPC .... G06F 3/064; G06F 3/0611; G06F 11/2033; G06F 13/385; G06F 3/061; G06F 9/45558; G06F 13/4022; G06F 11/2071; G06F 11/2092; H04L 67/1097; H04L 69/40
See application file for complete search history.

(56) References Cited

U.S. PATENT DOCUMENTS

| | | | |
|---|---|---|---|
| 6,687,746 B1 | 2/2004 | Shuster et al. | |
| 6,697,875 B1 | 2/2004 | Wilson | |
| 7,093,265 B1* | 8/2006 | Jantz ..................... | G06F 13/385 709/230 |
| 7,454,437 B1 | 11/2008 | Lavallee et al. | |

(Continued)

OTHER PUBLICATIONS

Kris Piepho, "Dell EMC SC Series Storage: Microsoft Muitipath I/O," Dell EMC Best Practices, Jan. 2017, 57 pages.

(Continued)

*Primary Examiner* — Dustin Nguyen
(74) *Attorney, Agent, or Firm* — Ryan, Mason & Lewis, LLP

(57) ABSTRACT

An apparatus in one embodiment comprises a host device configured to communicate over a network with a storage system comprising a plurality of storage devices. The host device comprises an MPIO driver that is configured to deliver input-output operations from the host device to the storage system over the network. The MPIO driver is configured to obtain a command generated by the host device under a first protocol for communicating with one or more of the storage devices. The command is directed to a target storage device of the plurality of storage devices. The target storage device is configured to communicate using a second protocol that is different than the first protocol. The MPIO driver is further configured to convert the command for communication under the second protocol and to provide the converted command to the target storage device.

20 Claims, 3 Drawing Sheets

(56) References Cited

U.S. PATENT DOCUMENTS

| | | | |
|---|---|---|---|
| 7,770,053 B1 | 8/2010 | Bappe et al. | |
| 7,809,912 B1 | 10/2010 | Raizen et al. | |
| 7,818,428 B1 | 10/2010 | Lavallee et al. | |
| 7,904,681 B1 | 3/2011 | Bappe et al. | |
| 7,925,872 B2 | 4/2011 | Lai et al. | |
| 9,400,611 B1 | 7/2016 | Raizen | |
| 9,594,760 B1 | 3/2017 | Esposito et al. | |
| 9,778,852 B1 | 10/2017 | Marshak et al. | |
| 10,496,486 B1* | 12/2019 | Rathi | G06F 11/2033 |
| 2004/0010563 A1 | 1/2004 | Forte et al. | |
| 2005/0015460 A1* | 1/2005 | Gole | H04L 69/40 709/213 |
| 2006/0277383 A1* | 12/2006 | Hayden | H04L 67/1097 711/170 |
| 2006/0285550 A1* | 12/2006 | Do | H04L 67/1097 370/443 |
| 2007/0174850 A1* | 7/2007 | El Zur | G06F 13/385 719/321 |
| 2008/0043973 A1 | 2/2008 | Lai et al. | |
| 2011/0197027 A1 | 8/2011 | Balasubramanian et al. | |
| 2013/0191590 A1* | 7/2013 | Malwankar | G06F 3/0611 711/114 |
| 2015/0269039 A1* | 9/2015 | Akirav | G06F 11/2092 714/4.11 |
| 2016/0062856 A1* | 3/2016 | Mu | G06F 11/2071 714/4.12 |
| 2016/0117113 A1 | 4/2016 | Li et al. | |
| 2017/0344259 A1* | 11/2017 | Freyensee | G06F 3/061 |
| 2018/0032471 A1* | 2/2018 | Olarig | G06F 13/4022 |
| 2018/0136957 A1* | 5/2018 | Guo | G06F 9/45558 |
| 2019/0324969 A1* | 10/2019 | Fujimoto | G06F 3/064 |
| 2020/0225863 A1* | 7/2020 | Veluswamy | G06F 3/061 |

OTHER PUBLICATIONS

NVM Express, "NVM Express, Revision 1.3," NVM Express, May 1, 2017, 282 pages.

Vmware, "Multipathing Configuration for Software iSCSI Using Port Binding," Technical White Paper, Apr. 25, 2012, 15 pages.

Dell EMC, "Dell EMC SC Series Storage: Microsoft Muitipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

U.S. Appl. No. 15/849,828 filed in the name of Sanjib Mallick et al. on Dec. 21, 2017 and entitled "Storage System with Input-Output Performance Control Utilizing Application Process Detection."

* cited by examiner

US 11,044,347 B2

COMMAND COMMUNICATION VIA MPIO DRIVER AGNOSTIC OF UNDERLYING COMMUNICATION PROTOCOLS

FIELD

The field relates generally to information processing systems, and more particularly to storage in information processing systems.

BACKGROUND

Storage arrays and other types of storage systems are often shared by multiple host devices over a network. A given host device may comprise a multipath input-output (MPIO) driver that is configured to process input-output (TO) operations for delivery from the given host device to the storage system. In some cases, the storage systems may implement a cluster environment where multiple host devices service a cluster of storage devices. In such a cluster environment, registration and reservation functionality may be used to implement IO fencing or other similar cluster management techniques.

SUMMARY

Illustrative embodiments of the present invention provide techniques for communicating commands via MPIO drivers agnostic of underlying communication protocols.

In one embodiment, an apparatus comprises a host device configured to communicate over a network with a storage system comprising a plurality of storage devices. The host device comprises an MPIO driver that is configured to deliver input-output operations from the host device to the storage system over the network. The MPIO driver is configured to obtain a command generated by the host device under a first protocol for communicating with one or more of the storage devices. The command is directed to a target storage device of the plurality of storage devices. The target storage device is configured to communicate using a second protocol that is different than the first protocol. The MPIO driver is further configured to convert the command for communication under the second protocol and to provide the converted command to the target storage device.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that embodiments of the present disclosure are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center that includes one or more clouds hosting multiple tenants that share cloud resources. Numerous other types of enterprise and cloud-based computing and storage systems are also encompassed by the term "information processing system" as that term is broadly used herein.

Figure 1:
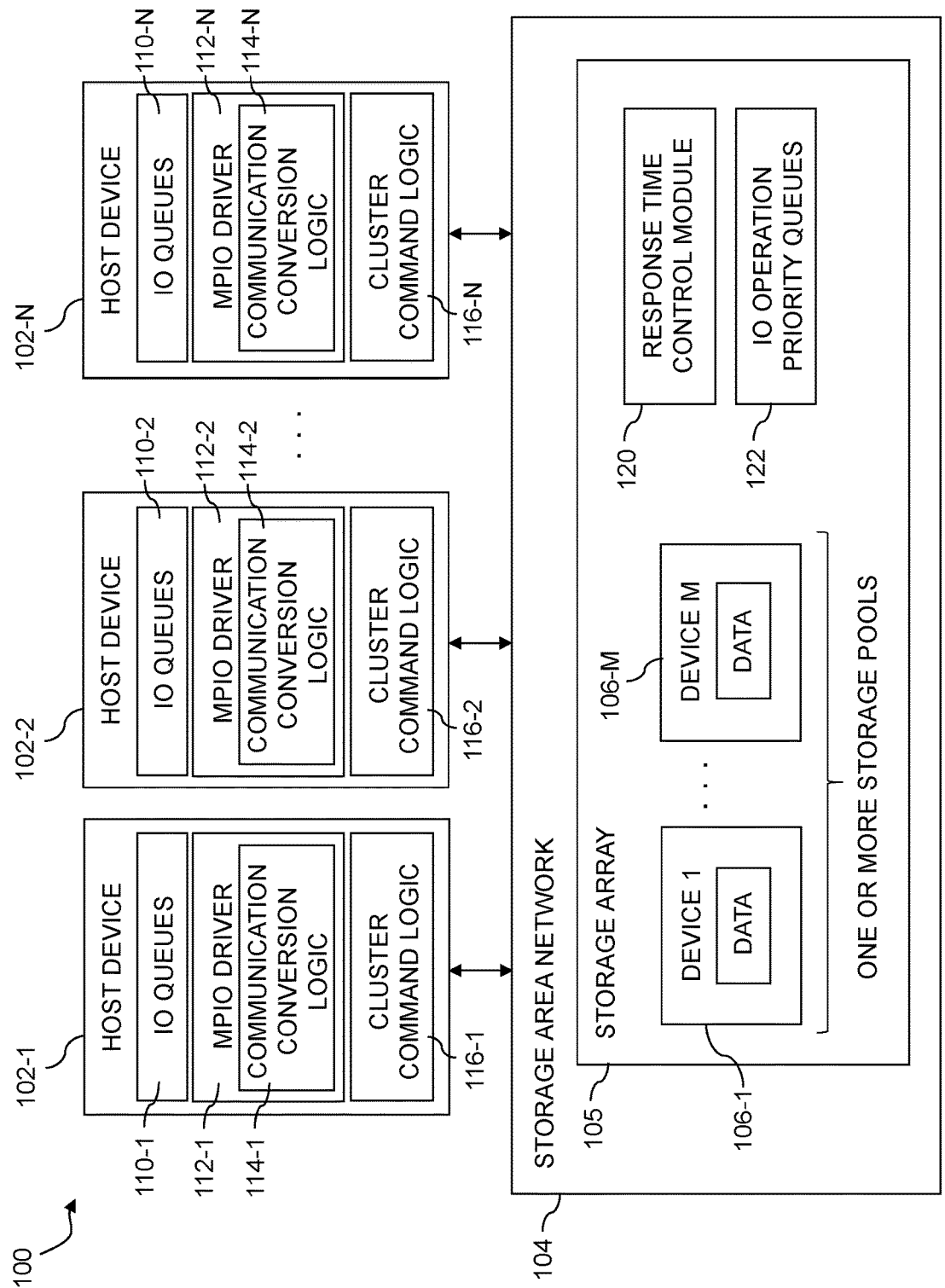
FIG. 1 is a block diagram of an information processing system configured with functionality for communicating commands via MPIO drivers agnostic of underlying communication protocols in an illustrative embodiment.

FIG. 1 shows an information processing system 100 configured in accordance with an illustrative embodiment. The information processing system 100 comprises a plurality of host devices 102-1, 102-2, ... 102-N. The host devices 102 communicate over a storage area network (SAN) 104 with at least one storage array 105. The storage array 105 comprises a plurality of storage devices 106-1, ... 106-M each storing data utilized by one or more applications running on one or more of the host devices 102. The storage devices 106 are illustratively arranged in one or more storage pools. The storage array 105 and its associated storage devices 106 are an example of what is more generally referred to herein as a "storage system." This storage system in the present embodiment is shared by the host devices 102, and is therefore also referred to herein as a "shared storage system."

The host devices 102 illustratively comprise respective computers, servers or other types of processing devices capable of communicating with the storage array 105 of the SAN 104. For example, at least a subset of the host devices 102 may be implemented as respective virtual machines of a compute services platform or other type of processing platform. The host devices 102 in such an arrangement illustratively provide compute services such as execution of one or more applications on behalf of each of one or more users associated with respective ones of the host devices 102. The term "user" herein is intended to be broadly construed so as to encompass numerous arrangements of human, hardware, software or firmware entities, as well as combinations of such entities. Compute services may be provided for users under a Platform-as-a-Service (PaaS) model, although it is to be appreciated that numerous other cloud infrastructure arrangements could be used.

The storage devices 106 of the storage array 105 of SAN 104 implement logical units (LUNs) configured to store objects for users associated with the host devices 102. These objects can comprise files, blocks or other types of objects. In illustrative embodiments, the storage devices 106 may comprise one or more clusters of storage devices 106. The host devices 102 interact with the storage array 105 utilizing read and write commands as well as other types of commands that are transmitted over the SAN 104. Such commands in some embodiments more particularly comprise small computer system interface (SCSI) commands or non-volatile memory express (NVMe) commands, depending on the type of storage device, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple IO paths to the storage array 105, with at least one of the storage devices 106 of the storage array 105 being visible to that host device on a given one of the paths. A given one of the storage devices 106 may be accessible to the given host device over multiple IO paths.

Different ones of the storage devices 106 of the storage array 105 illustratively exhibit different latencies in processing of IO operations. In some cases, the same storage device may exhibit different latencies for different ones of multiple IO paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The host devices 102 comprise respective sets of IO queues 110-1, 110-2, . . . 110-N, respective MPIO drivers 112-1, 112-2, . . . 112-N, and respective cluster command logic 116-1, 116-2, . . . 116-N. The MPIO drivers 112 collectively comprise a multipath layer of the host devices 102. The multipath layer provides functionality for communication conversion logic 114-1, 114-2, . . . 114-N implemented within the MPIO drivers 112.

MPIO drivers typically group all paths from a host device to a LUN into a single logical device known as a multipath logical device. The individual block devices representing each path are known as native devices. Applications use a multipath logical device for IO operations so that the IO operations may be distributed across all available paths. When paths fail, the MPIO driver will typically redirect the IO operations to other alive paths in the multipath logical device.

The MPIO drivers described herein may comprise, for example, otherwise conventional MPIO drivers, such as PowerPath® drivers from Dell EMC of Hopkinton, Mass., suitably modified in the manner disclosed herein to implement functionality for communicating commands via MPIO drivers agnostic of underlying communication protocols. Other types of MPIO drivers from other driver vendors may be suitably modified to incorporate functionality for communicating commands via MPIO drivers agnostic of underlying communication protocols as disclosed herein.

Paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from the respective addition or deletion of at least a portion of the storage devices 106 of the storage array 105.

Addition or deletion of paths can also occur as a result of zoning and masking changes or other types of storage system reconfigurations performed by a storage administrator or other user.

In some embodiments, paths are added or deleted in conjunction with the addition of a new storage array or the deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be performed by the MPIO drivers of the multipath layer as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well as to discover the disappearance of any existing LUNs that have been deleted from the storage array 105.

For each of one or more new paths identified in a path discovery scan of the type described above, the corresponding one of the host devices 102 is configured to execute a host registration operation for that path. The host registration operation for a given new path illustratively provides notification to the storage array 105 that the corresponding one of the host devices 102 has discovered the new path.

The MPIO drivers utilize the multiple paths described above to send IO operations from the host devices 102 to the storage array 105.

For example, an MPIO driver 112-1 is configured to select IO operations from its corresponding set of IO queues 110-1 for delivery to the storage array 105 over the SAN 104. The sources of the IO operations stored in the set of IO queues 110-1 illustratively include respective processes of one or more applications executing on the host device 102-1. Other types of sources of IO operations may be present in a given implementation of system 100.

In some embodiments, migration involves synchronizing the target storage device or LUN to the source storage device or LUN, i.e., achieving an operating state in which the target storage device or LUN stores the same data as the source storage device or LUN, and then a path flip operation is performed so that subsequent accesses of the data are directed to the target storage device or LUN instead of the source storage device or LUN. Once the path flip operation is successfully accomplished, the source storage device or LUN can be taken out of service or put to some other use.

A number of data migration technologies are available to migrate data from a source LUN to a target LUN. One such data migration tool is Dell EMC PowerPath® Migration Enabler (PPME). PowerPath®, of which PPME is one component, is available on common operating systems such as Linux, Windows, AIX and VMware ESX. PPME uses multiple data transfer technologies for data migration including, for example, host copy, open replicator, and other similar technologies.

In some embodiments, clustering is used in computer systems to provide certain desirable functionality and characteristics from the perspective of external users. Advantages include increased performance and availability over non-clustered systems. Two general types of clusters that may be implemented by cluster command logic 116 are "failover" and "active-active" (or "parallel") clusters. In a failover cluster, all cluster nodes may be aware of a given storage device accessible in the cluster, but in general a given storage device is accessed by only one node during operation. In the event of node failure, a failover mechanism causes ownership of the storage device to be transferred to a new node that has assumed responsibility for the workload of the failed node. Due to the single-node access, there is no need for synchronizing accesses among the host devices.

In active-active clusters, storage devices may be actively accessed from all nodes in the cluster, and the operating software (e.g., application software) of the nodes is responsible for synchronizing access to shared storage resources. For example, IO fencing may be used to synchronize access to shared storage resources.

The storage array 105 in the present embodiment is assumed to comprise a persistent memory that is implemented using a flash memory or other types of non-volatile memory of the storage array 105. More particular examples include NAND-based flash memory or other types of non-volatile memory such as resistive RAM, phase change memory, spin torque transfer magneto-resistive RAM (STT-MRAM) and Intel Optane™ devices based on 3D Point™ memory. The persistent memory is further assumed to be separate from the storage devices 106 of the storage array 105, although in other embodiments the persistent memory may be implemented as a designated portion or portions of one or more of the storage devices 106. For example, in some embodiments the storage devices 106 may comprise flash-based storage devices, as in embodiments involving all-flash storage arrays.

The storage array 105 in the present embodiment further comprises additional components such as response time control module 120 and IO operation priority queues 122, illustratively configured to make use of the above-described persistent memory. For example, the response time control module 120 may be used to implement storage array-based adjustments in response time for particular IO operations based at least in part on service level objective (SLO) information stored by the storage array 105 in its persistent memory. The response time control module 120 operates in conjunction with the IO operation priority queues 122.

The storage array 105 utilizes its IO operation priority queues 122 to provide different levels of performance for IO operations. For example, the IO operation priority queues 122 may have respective different priority levels. The storage array 105 may be configured to provide different priority levels for different ones of the IO operations by assigning different ones of the IO operations to different ones of the IO operation priority queues 122. The IO operation priority queues 122 are illustratively associated with respective SLOs for processing of IO operations in the storage array 105.

Process tags may be used in assigning different ones of the IO operations to different ones of the IO operation priority queues 122, as disclosed in U.S. patent application Ser. No. 15/849,828, filed Dec. 21, 2017, and entitled "Storage System with Input-Output Performance Control Utilizing Application Process Detection," which is incorporated by reference herein.

As mentioned above, communications between the host devices 102 and the storage array 105 may utilize PCIe connections or other types of connections implemented over one or more networks. For example, illustrative embodiments can use interfaces such as Serial Attached SCSI (SAS) and Serial ATA (SATA). Numerous other interfaces and associated communication protocols can be used in other embodiments.

The storage array 105 in some embodiments may be implemented as part of cloud infrastructure in the form of a cloud-based system such as an Amazon Web Services (AWS) system. Other examples of cloud-based systems that can be used to provide at least portions of the storage array 105 and possibly other portions of system 100 include Google Cloud Platform (GCP) and Microsoft Azure.

The storage array 105 may additionally or alternatively be configured to implement multiple distinct storage tiers of a multi-tier storage system. By way of example, a given multi-tier storage system may comprise a fast tier or performance tier implemented using flash storage devices, and a capacity tier implemented using hard disk drive devices. A wide variety of other types of server-based flash storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, disk drives, flash drives, solid-state drives, hybrid drives or other types of storage products and devices, or portions thereof, and illustratively include logical storage devices such as LUNs.

As another example, the storage array 105 may be used to implement one or more storage nodes in a cluster storage system comprising a plurality of storage nodes interconnected by one or more networks.

It should therefore be apparent that the term "storage array" as used herein is intended to be broadly construed, and may encompass multiple distinct instances of a commercially-available storage array suitably reconfigured to support communicating commands via MPIO drivers agnostic of underlying communication protocols as disclosed herein.

For example, the storage array 105 may comprise one or more storage arrays such as VNX®, Symmetrix VMAX® and Unity™ storage arrays, commercially available from Dell EMC. Other types of storage products that can be used in implementing a given storage system in illustrative embodiments include software-defined storage products such as ScaleIO™, cloud storage products such as Elastic Cloud Storage (ECS), object-based storage products such as Atmos, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

In illustrative embodiments, the MPIO drivers 112-1, 112-2, . . . 112-N provide functionality for communication of commands generated by the respective cluster command logic 116-1, 116-2, . . . 116-N or their respective host devices 102-1, 102-2 . . . 102-N to the storage devices 106 such as, e.g., registration and reservation commands or other communications, for example, using respective communication conversion logic 114-1, 114-2, . . . 114-N implemented within the MPIO drivers 112-1, 112-2 . . . 112-N.

In such embodiments, the cluster command logic 116 running on each of the host devices 102 is configured to manage only a single type of cluster, e.g., a cluster comprising SCSI storage devices or a cluster comprising NVMe storage devices. For example, cluster command logic 116 that is configured to manage SCSI storage devices using SCSI-based functionality may only be configured to generate SCSI-based registration and reservation commands or other SCSI-based communications using SCSI-based communication protocols, while cluster command logic 116 that is configured to manage NVMe storage devices using NVMe-based functionality may only be configured to generate NVMe-based registration and reservation commands or other NVMe-based communications using NVMe-based communication protocols. If a NVMe storage device is installed in a cluster in which the cluster command logic 116 is configured to communicate using SCSI-based protocols and functionality, the cluster command logic's SCSI-based registration or reservation commands will not be supported by the NVMe device. Likewise, if a SCSI storage device is installed in a cluster in which the cluster command logic 116 is configured to communicate using NVMe-based protocols and functionality, the cluster command logic's NVMe-based registration or reservation commands will not be supported by the SCSI device.

Replacing or upgrading the cluster command logic 116 running on a host device 102 to provide both SCSI and NVMe functionality requires significant effort including downtime of applications and other functionality executing on the host device 102, which is undesirable, even if such upgraded logic is available, which is not guaranteed.

In illustrative embodiments, MPIO drivers 112 residing on the host devices 102 comprise communication conversion logic 114 which enables both SCSI and NVMe storage devices to be added to the same cluster agnostic of whether the cluster command logic 116 for that cluster uses SCSI-based or NVMe-based protocols and functionality. For example, communication conversion logic 114 is configured to convert registration and reservation commands or other communications generated by the cluster software 116 of a host device 102 from SCSI protocols to NVMe protocols, or vice versa, and to provide those converted commands or communications to the SCSI and NVMe storage devices according to their respective communication protocol and functionality. Any responses to the commands received from the SCSI or NVMe storage devices are likewise converted to the functionality (e.g., SCSI or NVMe) of the cluster command logic 116 running on the host device 102.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, MPIO drivers 112, communication conversion logic 114 and cluster command logic 116 can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

Figure 2:
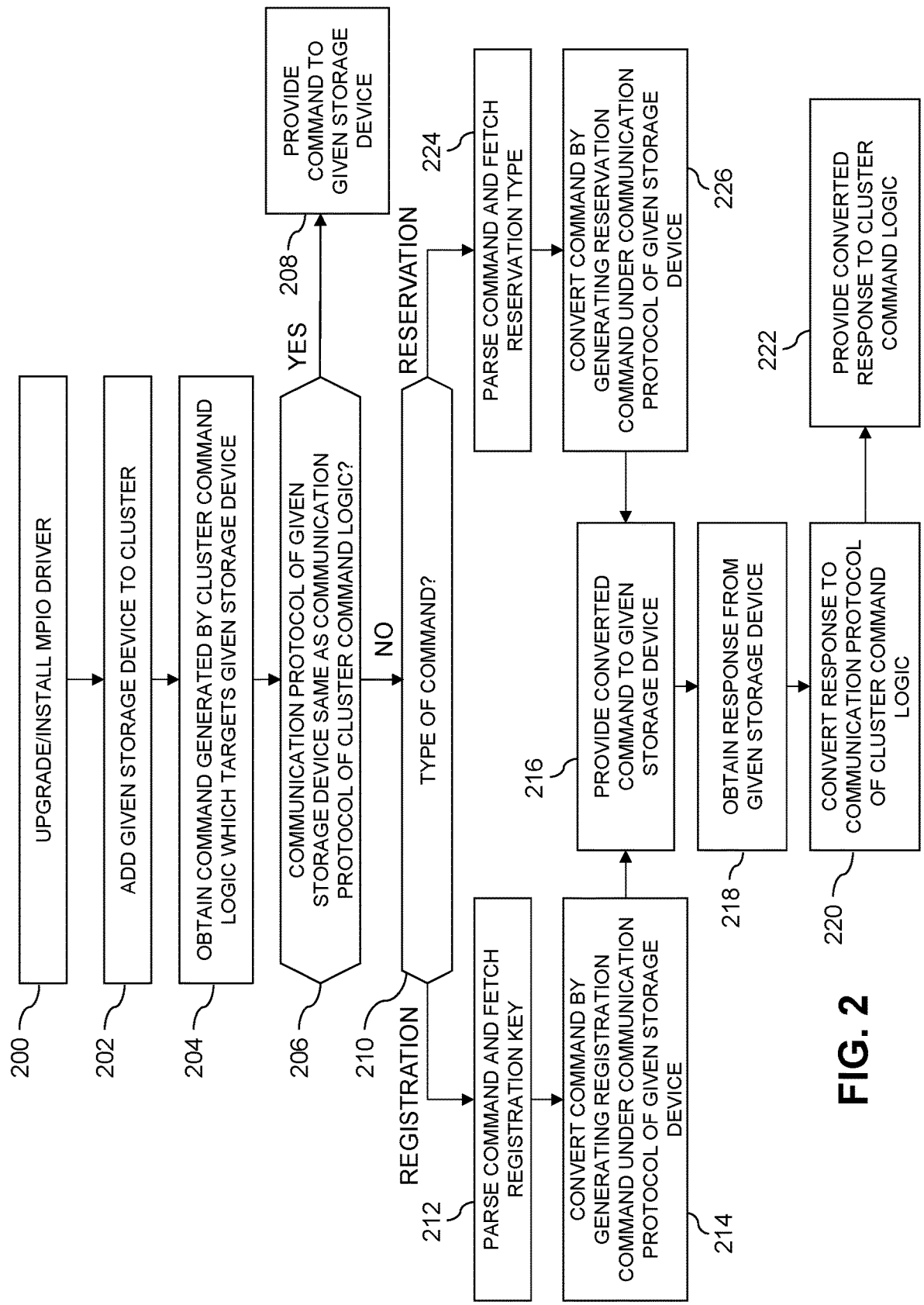
FIG. 2 is a flow diagram of an example process for communicating commands via MPIO drivers agnostic of underlying communication protocols in an illustrative embodiment.
Figure 3:
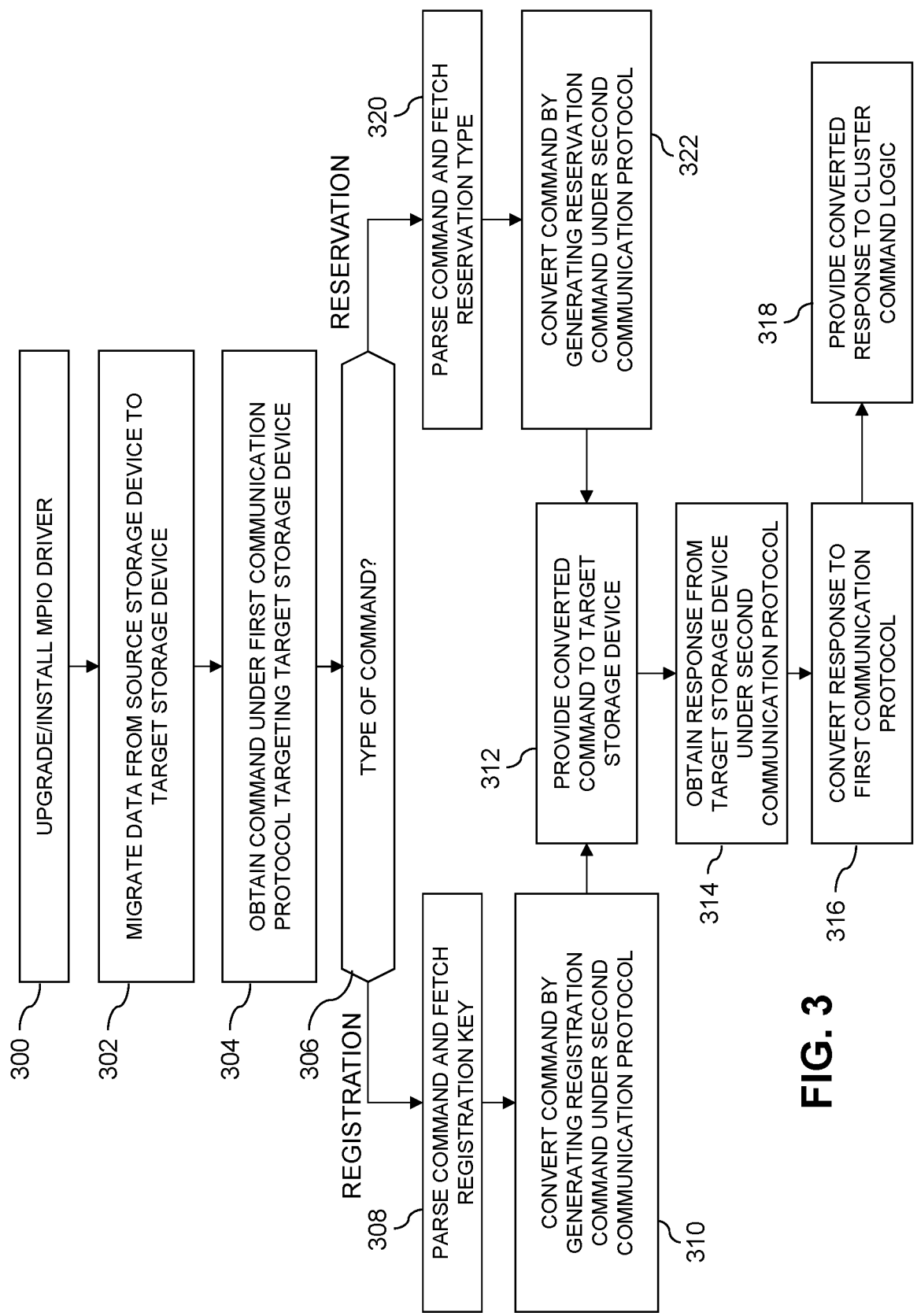
FIG. 3 is a flow diagram of an example process for communicating commands via MPIO drivers agnostic of underlying communication protocols in an illustrative embodiment.

Illustrative embodiments of the techniques and functionality of communication conversion logic 114 will now be described in more detail with reference to the flow diagrams of FIGS. 2 and 3. FIGS. 2 and 3 provide example processes that are implemented by communication conversion logic 114 to convert commands generated by cluster command logic 116 to the corresponding communication protocol of a target storage device 106 in response to two example scenarios. The first example scenario, with reference to FIG. 2, illustrates an example process implemented by communication conversion logic 114 when a storage device 106 is added to an existing storage cluster managed by cluster command logic 116 that has a different communication protocol than the added storage device 106. The second example scenario, with reference to FIG. 3, illustrates an example process implemented by communication conversion logic 114 when data is migrated from a source storage device 106 to a target storage device 106 that has a different communication protocol than the source storage device 106 and the cluster command logic 116.

In both example scenarios, a cluster of storage devices 106 is managed by cluster command logic 116. In some embodiments, the cluster command logic 116 is configured to communicate using one of SCSI and NVMe communication protocols. In some embodiments the cluster of storage devices 106 comprises only SCSI storage devices 106. In some embodiments, the cluster of storage devices 106 comprises only NVMe storage devices. In some embodiments, the cluster of storage devices 106 may comprise both SCSI and NVMe storage devices 106. In illustrative embodiments, even where the cluster comprises both SCSI and NVMe storage devices 106, cluster command logic 116 is unable to command at least some of the storage devices 106 due to the difference in communication protocol. For example, if the cluster command logic 116 is configured to generate commands using SCSI protocols, such commands will not be supported by the NVMe storage devices 106 of the cluster. Similarly, if the cluster command logic 116 is configured to generate commands using the NVMe protocols, such commands will not be supported by the SCSI storage devices 106 of the cluster.

The communication conversion logic 114 comprises functionality to detect a communication protocol of each of the storage devices 106 in the cluster and to convert commands generated by the cluster command logic 116 into commands that use the communication protocol of each respective storage device 106, when the communication protocol used by the cluster command logic 116 is different than the communication protocol used by a respective one of the storage device 106.

In some embodiments, the communication conversion logic 114 is configured to obtain an identifier associated with a storage device and determine a type of the storage device 106 based on the obtained identifier. In some embodiments, for example, the identifier may comprise a name of the storage device 106. For example, identifier may be included in an internal storage device specific data structure maintained by an operating system of the host device that maintains a list of the storage devices 106 included in the cluster.

The process as shown in FIG. 2 includes steps 200 through 226, and is suitable for use in the system 100 but is more generally applicable to other types of systems comprising multiple host devices and a shared storage system.

At 200, the MPIO driver that is installed on the host is upgraded to include communication conversion logic 114. In some embodiments, a new MPIO driver that includes communication conversion logic 114 may alternatively be installed.

At 202, a given storage device 106 is added to the cluster. An identifier associated with the given storage device 106 is added to the internal device specific data structure maintained by the operating system of the host device 102.

At 204, the communication conversion logic 114 obtains a command generated by the cluster command logic 116 of the host device 102 which targets a given storage device 106.

At 206, the communication conversion logic 114 determines whether the given storage device is configured to use the same communication protocol as the cluster command logic 116, e.g., SCSI, NVMe, or another communication protocol. For example, the communication conversion logic 114 may obtain the identifier associated with the given storage device 106 and may determine based on the identifier which communication protocol the given storage device 106 is configured to use. If the given storage device 106 is configured to use the same communication protocol as the cluster command logic 116, the command is provided as is to the given storage device 106 at 208.

At 210, if the given storage device 106 is configured to use a different communication protocol than the cluster command logic 116, communication conversion logic 114 decodes the command to determine a type of the command. For example, the command may be parsed to determine if it is a registration command, a reservation command, or another type of command. In some embodiments, for example, an opcode of the command may be parsed to determine the type of the command.

At 212, if communication conversion logic 114 determines that the command is a registration command, communication conversion logic 114 parses the command to fetch the registration key associated with the command.

At 214, communication conversion logic 114 converts the command to a converted command under the communication protocol of the given storage device 106. For example, communication conversion logic 114 may generate a registration command under the communication protocol of the given storage device 106 based at least in part on the command and the registration key. For example, if the command is a SCSI-based registration command and the given storage device is configured to communicate using NVMe protocols, an NVMe registration command is generated by the communication conversion logic 114. For example, the registration key may be embedded in the NVMe registration command. Likewise, if the command is an NVMe-based registration command and the given storage device is configured to communicate using SCSI protocols, a SCSI registration command is generated by the communication conversion logic 114. For example, the registration key may be embedded in the SCSI registration command.

At 216, communication conversion logic 114 provides the converted command to the given storage device 106.

At 218, the communication conversion logic 114 obtains a response to the converted command from the given storage device 106. For example, the communication conversion logic 114 may receive command completion codes or another indication from the given storage device 106.

At 220, the communication conversion logic 114 converts the response to the communication protocol of the cluster command logic 116.

At 222, the communication conversion logic 114 provides the converted response to the cluster command logic 116.

Referring back to 210, if communication conversion logic 114 determines that the command is a reservation command, communication conversion logic 114 parses and fetches a reservation type associated with the command at 224.

At 226, communication conversion logic 114 converts the command to a converted command under the communication protocol of the given storage device 106. For example, communication conversion logic 114 may generate a reservation command under the communication protocol of the given storage device 106 based at least in part on the command and the parsed and fetched reservation type. For example, if the command is a SCSI-based reservation command and the given storage device is configured to communicate using NVMe protocols, an NVMe reservation command is generated by the communication conversion logic 114. For example, the reservation type may be embedded in the NVMe reservation command. Likewise, if the command is an NVMe-based reservation command and the given storage device is configured to communicate using SCSI protocols, a SCSI reservation command is generated by the communication conversion logic 114. For example, the reservation type may be embedded in the SCSI registration command. The process then proceeds to 216.

The process as shown in FIG. 3 includes steps 300 through 322, and is suitable for use in the system 100 but is more generally applicable to other types of systems comprising multiple host devices and a shared storage system.

At 300, the MPIO driver that is installed on the host is upgraded to include communication conversion logic 114. In some embodiments, a new MPIO driver that includes communication conversion logic 114 may alternatively be installed.

At 302, data is migrated from a source storage device 106 that is configured to communicate using a first communication protocol, e.g., SCSI, NVMe, or another communication protocol, to a target storage device 106 that is configured to communicate using second communication protocol, e.g., SCSI, NVMe, or another communication protocol, that is different than the first communication protocol. In this scenario, the cluster command logic 116 is assumed to be configured to also use the first communication protocol.

At 304, the communication conversion logic 114 obtains a command generated by the cluster command logic 116 of the host device 102 under the first communication protocol after completion of the data migration which targets the data that was migrated to the target storage device 106. Since the cluster command logic is not aware of the change in underlying device communication protocol for the target data, i.e., from the first communication protocol to the second communication protocol, it will generate the command under the first communication protocol.

At 306, communication conversion logic 114 decodes the command to determine a type of the command. For example, the command may be parsed to determine if it is a registration command, a reservation command, or another type of command. In some embodiments, for example, an opcode of the command may be parsed to determine the type of the command.

At 308, if communication conversion logic 114 determines that the command is a registration command, communication conversion logic 114 parses the command to fetch the registration key associated with the command.

At 310, communication conversion logic 114 converts the command to a converted command under the second communication protocol. For example, communication conversion logic 114 may generate a registration command under the second communication protocol based at least in part on the command and the registration key. For example, if the first communication protocol is a SCSI protocol and the second communication protocol is an NVMe protocol, an NVMe registration command is generated by the communication conversion logic 114. For example, the registration key may be embedded in the NVMe registration command. Likewise, if the first communication protocol is an NVMe protocol and the second communication protocol is an SCSI protocol, a SCSI registration command is generated by the communication conversion logic 114. For example, the registration key may be embedded in the SCSI registration command.

At 312, communication conversion logic 114 provides the converted command to the target storage device 106.

At 314, the communication conversion logic 114 obtains a response to the converted command from the target storage device 106 under the second communication protocol. For example, the communication conversion logic 114 may receive command completion codes or other indications from the target storage device 106 which are provided under the second communication protocol.

At 316, the communication conversion logic 114 converts the response from the second communication protocol to the first communication protocol.

At 318, the communication conversion logic 114 provides the converted response to the cluster command logic 116.

Referring back to 306, if communication conversion logic 114 determines that the command is a reservation command, communication conversion logic 114 parses and fetches a reservation type associated with the command at 320.

At 322, communication conversion logic 114 converts the command to a converted command under the second communication protocol. For example, communication conversion logic 114 may generate a reservation command under the second communication protocol based at least in part on the command and the parsed and fetched reservation type. For example, if the first communication protocol is a SCSI protocol and the second communication protocol is an NVMe protocol, an NVMe reservation command is generated by the communication conversion logic 114. For example, the reservation type may be embedded in the NVMe reservation command. Likewise, if the first communication protocol is an NVMe protocol and the second communication protocol is an SCSI protocol, a SCSI reservation command is generated by the communication conversion logic 114. For example, the reservation type may be embedded in the SCSI reservation command. The process then proceeds to 312.

Separate instances of the processes of FIGS. 2 and 3 may be performed in respective additional host devices that share the storage array.

The particular processing operations and other system functionality described in conjunction with the flow diagrams of FIGS. 2 and 3 are presented by way of illustrative example only, and should not be construed as limiting the scope of the disclosure in any way. Alternative embodiments can use other types of processing operations involving host devices, storage systems and communication conversion logic. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different communication conversion logic arrangements within a given information processing system.

Functionality such as that described in conjunction with the flow diagrams of FIGS. 2 and 3 can be implemented at least in part in the form of one or more software programs stored in memory and executed by a processor of a processing device such as a computer or server. As will be described herein, a memory or other storage device having executable program code of one or more software programs embodied therein is an example of what is more generally referred to herein as a "processor-readable storage medium."

The above-described functions associated with functionality for communicating commands via MPIO drivers agnostic of underlying communication protocols are carried out at least in part under the control of its communication conversion logic 114. For example, communication conversion logic 114 is illustratively configured to control performance of portions of the process shown in the flow diagrams described above in conjunction with FIGS. 2 and 3.

It is assumed that each of the other MPIO drivers 112 are configured in a manner similar to that described above and elsewhere herein for the first MPIO driver 112-1. The other host devices 102 of the system 100 are therefore also configured to communicate over the SAN 104 with the storage array 105, and the MPIO drivers 112 of such other host devices 102 are each similarly configured to select IO operations from a corresponding one of the sets of IO queues 110 for delivery to the storage array 105 over the SAN 104, and to perform the disclosed functionality for communicating commands via MPIO drivers agnostic of underlying communication protocols. Accordingly, functionality described above in the context of the first MPIO driver 112-1 is assumed to be similarly performed by each of the other MPIO drivers 112-2 through 112-N.

The MPIO drivers 112 may be otherwise configured utilizing well-known MPIO functionality such as that described in K. Piepho, "Dell EMC SC Series Storage: Microsoft Multipath I/O," Dell EMC Engineering, June 2017, which is incorporated by reference herein. Such conventional MPIO functionality is suitably modified in illustrative embodiments disclosed herein to support communicating commands via MPIO drivers agnostic of underlying communication protocols in a cluster environment.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVMe Specification, Revision 1.3, May 2017, which is incorporated by reference herein. Other storage protocols of this type that may be utilized in illustrative embodiments disclosed herein include NVMe over Fabric, also referred to as NVMeoF.

As indicated previously, absent use of functionality for communicating commands via MPIO drivers agnostic of underlying communication protocols as disclosed herein, cluster command logic installed on a host device that is configured to support a particular communication protocol, e.g., SCSI, NVMe or another communication protocol, will not be able to utilize storage devices that are configured to use a communication protocol, e.g., SCSI, NVMe or another communication protocol, that is different than the particular communication protocol without first updating or replacing the cluster command logic which would require significant application downtime, if such update is even available which is not guaranteed.

Such drawbacks are advantageously overcome in illustrative embodiments herein by utilization of communication conversion logic 114 to implement functionality for communicating commands via MPIO drivers agnostic of underlying communication protocols as described above. For example, by using the MPIO driver to convert the commands generated by the cluster command logic under a first communication protocol to a second communication protocol of an underlying target storage device, no update of the cluster command logic is necessary when adding new devices that have different communication protocols to the cluster. In addition, the cluster command logic may continue operating and generating commands as normal under the first communication protocol agnostic of the types of devices and their corresponding communication protocols that are added to the cluster since the MPIO driver handles the conversion.

It is to be appreciated that the particular advantages described above are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems such as Amazon Web Services, Google Cloud Platform and Microsoft Azure. Virtual machines provided in such systems can be used to implement a fast tier or other front-end tier of a multi-tier storage system in illustrative embodiments. A capacity tier or other back-end tier of such a multi-tier storage system can be implemented using one or more object stores such as Amazon S3, Google Cloud Platform Cloud Storage, and Microsoft Azure Blob Storage.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the communication conversion logic 114 may be implemented at least in part in software, as indicated previously herein.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, processors, memories, IO queues, MPIO drivers, communication conversion logic, cluster command logic and additional or alternative components. Also, the particular configurations of system and device elements and associated processing operations illustratively shown in the drawings can be varied in other embodiments. For example, a wide variety of different MPIO driver configurations and associated communication conversion logic arrangements can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
a host device configured to communicate over a network with a storage system comprising a plurality of storage devices;
the host device comprising a processing device comprising at least one processor coupled to memory, the processing device being configured to implement cluster command logic for generating commands under a first protocol, the processing device being configured to implement a multi-path input-output driver that is configured to deliver input-output operations from the host device to the storage system over the network, the multi-path input-output driver of the host device being further configured to submit commands to one or more of the storage devices under the first protocol, wherein the multi-path input-output driver is further configured:
to obtain a command generated by the cluster command logic of the host device under the first protocol, the command being directed to a target storage device of the plurality of storage devices;
to determine a type of the target storage device;
to determine a second protocol corresponding to the identified type of the target storage device, the target storage device being configured to submit responses to the host device under the second protocol, the second protocol being different than the first protocol;

to convert the command for communication under the second protocol; and to submit the converted command to the target storage device under the second protocol.

2. The apparatus of claim 1 wherein the first protocol is one of a small computer system interface (SCSI) protocol and a non-volatile memory express (NVMe) protocol, and wherein the second protocol is the other of the SCSI protocol and the NVMe protocol.

3. The apparatus of claim 2 wherein converting the command comprises translating the command from the one of the SCSI protocol and the NVMe protocol to the other of the SCSI protocol and the NVMe protocol.

4. The apparatus of claim 1 wherein the command is a registration command that is configured to register the target storage device for use with the host device.

5. The apparatus of claim 1 wherein the command is a reservation command that is configured to reserve the target storage device for use by the host device.

6. The apparatus of claim 1 wherein determining the type of the target storage device comprises determining an identifier of the target storage device, the identifier comprising an indication of the type of the target storage device.

7. The apparatus of claim 1 wherein the multi-path input-output driver is further configured:

to obtain a response to the converted command from the target storage device under the second protocol;

to convert the response to the first protocol; and to provide the converted response to the host device.

8. A method comprising:

obtaining, by a multi-path input-output driver implemented by a processing device of a host device, the multi-path input-output driver being configured to communicate over a network with a storage system comprising a plurality of storage devices, a command generated under a first protocol by cluster command logic implemented by the processing device of the host device, the multi-path input-output driver of the host device being further configured to submit commands to one or more of the storage devices under the first protocol, the command being directed to a target storage device of the plurality of storage devices;

determining, by the multi-path input-output driver, a type of the target storage device;

determining, by the multi-path input-output driver, a second protocol corresponding to the identified type of the target storage device, the target storage device being configured to submit responses to the host device under the second protocol, the second protocol being different than the first protocol;

converting, by the multi-path input-output driver, the command for communication under the second protocol; and submitting, by the multi-path input-output driver, the converted command to the target storage device under the second protocol;

wherein the processing device of the host device comprises a processor coupled to a memory.

9. The method of claim 8 wherein the first protocol is one of a small computer system interface (SCSI) protocol and a non-volatile memory express (NVMe) protocol, and wherein the second protocol is the other of the SCSI protocol and the NVMe protocol.

10. The method of claim 9 wherein converting the command comprises translating the command from the one of the SCSI protocol and the NVMe protocol to the other of the SCSI protocol and the NVMe protocol.

11. The method of claim 8 wherein determining the type of the target storage device comprises determining an identifier of the target storage device, the identifier comprising an indication of the type of the target storage device.

12. The method of claim 8 further comprising, by the multi-path input-output driver:

obtaining a response to the converted command from the target storage device under the second protocol;

converting the response to the first protocol; and providing the converted response to the host device.

13. A computer program product comprising a non-transitory processor-readable storage medium having stored therein program code of one or more software programs, wherein the program code, when executed by a multi-path input-output driver implemented by a processing device of a host device, the processing device comprising a processor coupled to a memory, the multi-path input-output driver being configured to communicate over a network with a storage system comprising a plurality of storage devices, the processing device being configured to implement cluster command logic for generating commands under a first protocol, the multi-path input-output driver being further configured to submit commands to one or more of the storage devices under the first protocol, causes the multi-path input-output driver:

to obtain a command generated by the cluster command logic of the host device under the first protocol, the command being directed to a target storage device of the plurality of storage devices;

to determine a type of the target storage device;

to determine a second protocol corresponding to the identified type of the target storage device, the target storage device being configured to submit responses to the host device under the second protocol, the second protocol being different than the first protocol;

to convert the command for communication under the second protocol; and to submit the converted command to the target storage device under the second protocol.

14. The computer program product of claim 13 wherein:

the first protocol is one of a small computer system interface (SCSI) protocol and a non-volatile memory express (NVMe) protocol;

the second protocol is the other of the SCSI protocol and the NVMe protocol; and wherein converting the command comprises translating the command from the one of the SCSI protocol and the NVMe protocol to the other of the SCSI protocol and the NVMe protocol.

15. The computer program product of claim 13 wherein:

determining the type of the target storage device comprises determining an identifier of the target storage device, the identifier comprising an indication of the type of the target storage device.

16. The computer program product of claim 13 wherein the program code further causes the multi-path input-output driver:

to obtain a response to the converted command from the target storage device under the second protocol;

to convert the response to the first protocol; and to provide the converted response to the host device.

17. The apparatus of claim 1 wherein the multi-path input-output driver is further configured:

to obtain a second command generated by the cluster command logic of the host device under the first protocol, the second command being directed to a second storage device of the plurality of storage devices;

to determine a second type of the second storage device;

to determine that the first protocol corresponds to the identified second type of the second storage device; and to submit the second command to the second storage device under the first protocol.

18. The apparatus of claim 17 wherein determining that the first protocol corresponds to the identified second type of the second storage device comprises determining that both the host device and the second storage device are configured to communicate using the first protocol.

19. The method of claim 8 wherein the method further comprises:

obtaining, by the multi-path input-output driver, a second command generated by the cluster command logic of the host device under the first protocol, the second command being directed to a second storage device of the plurality of storage devices;

determining, by the multi-path input-output driver, a second type of the second storage device;

determining, by the multi-path input-output driver, that the first protocol corresponds to the identified second type of the second storage device; and submitting, by the multi-path input-output driver, the second command to the second storage device under the first protocol.

20. The computer program product of claim 13 wherein the multi-path input-output driver is further configured:

to obtain a second command generated by the cluster command logic of the host device under the first protocol, the second command being directed to a second storage device of the plurality of storage devices;

to determine a second type of the second storage device;

to determine that the first protocol corresponds to the identified second type of the second storage device; and to submit the second command to the second storage device under the first protocol.

* * * * *